(12) United States Patent
Liu

(10) Patent No.: US 12,236,421 B2
(45) Date of Patent: Feb. 25, 2025

(54) BLOCK PACKAGING METHOD BASED ON BLOCKCHAIN TRANSACTION AND ELECTRONIC DEVICE USING THE SAME

(71) Applicant: HON HAI PRECISION INDUSTRY CO., LTD., New Taipei (TW)

(72) Inventor: Shiaw-Herng Liu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 252 days.

(21) Appl. No.: 17/552,879

(22) Filed: Dec. 16, 2021

(65) Prior Publication Data
US 2022/0198449 A1 Jun. 23, 2022

(30) Foreign Application Priority Data
Dec. 23, 2020 (CN) .......................... 202011541034.3

(51) Int. Cl.
| | | |
|---|---|---|
| G06Q 20/38 | (2012.01) | |
| H04L 9/00 | (2022.01) | |
| H04L 9/32 | (2006.01) | |
| H04L 67/104 | (2022.01) | |

(52) U.S. Cl.
CPC ... *G06Q 20/38215* (2013.01); *G06Q 20/3827* (2013.01); *H04L 9/3242* (2013.01); *H04L 67/104* (2013.01); *H04L 9/50* (2022.05); *H04L 2209/56* (2013.01)

(58) Field of Classification Search
CPC .. G06Q 20/38; G06Q 20/401; G06Q 20/3825; G06Q 20/3827; G06Q 20/38215; H04L 67/10; H04L 67/104; H04L 41/00; H04L 41/30; H04L 2209/56; H04L 9/30; H04L 9/38; H04L 9/3255; G06F 8/60; G06F 9/46
USPC ........................................................ 709/153
See application file for complete search history.

(56) References Cited

U.S. PATENT DOCUMENTS

| | | | |
|---|---|---|---|
| 11,341,009 B1 * | 5/2022 | Wu | G06F 16/182 |
| 2018/0039667 A1 * | 2/2018 | Pierce | H04L 9/3247 |
| 2018/0276668 A1 * | 9/2018 | Li | H04L 9/3239 |
| 2019/0057211 A1 * | 2/2019 | Wright | G06Q 20/3827 |

(Continued)

FOREIGN PATENT DOCUMENTS

| | | | |
|---|---|---|---|
| CN | 110708171 | 1/2020 | |
| CN | 111930845 A | 11/2020 | |
| WO | WO-2019232789 A1 * | 12/2019 | G06N 7/005 |

*Primary Examiner* — James N Fiorillo
(74) *Attorney, Agent, or Firm* — ScienBiziP, P.C.

(57) ABSTRACT

A block packaging method based on blockchain transaction is used in an electronic device. The electronic device controls each node in the blockchain to receive and store a blockchain transaction, and calculate a hash value of the each node according to the blockchain transaction, generate a package voting information according to the hash value of the each node, and send the package voting information to a voted node. The electronic device further controls the each node to record the number of votes as the voted nodes according to the package voting information to obtain the number of votes of the each node, take the node with the largest number of votes as a target node according to the number of votes, and pack the blockchain transaction into blocks and broadcast the blocks to all nodes in the blockchain.

11 Claims, 3 Drawing Sheets

(56) References Cited

U.S. PATENT DOCUMENTS

| | | | |
|---|---|---|---|
| 2019/0149337 A1* | 5/2019 | Savanah | H04L 9/3066 |
| | | | 713/168 |
| 2019/0182313 A1* | 6/2019 | Yoo | H04L 67/10 |
| 2019/0260715 A1* | 8/2019 | Suzuki | H04L 9/0618 |
| 2019/0289068 A1* | 9/2019 | Ma | H04L 69/22 |
| 2019/0349733 A1* | 11/2019 | Nolan | G06F 16/1834 |
| 2019/0361917 A1* | 11/2019 | Tran | H04W 12/108 |
| 2020/0211011 A1* | 7/2020 | Anderson | G06Q 20/3674 |
| 2020/0396065 A1* | 12/2020 | Gutierrez-Sheris | |
| | | | H04L 9/3297 |
| 2021/0099312 A1* | 4/2021 | Guo | G06F 16/1837 |
| 2021/0126826 A1* | 4/2021 | Nolan | H04L 45/20 |
| 2021/0158352 A1* | 5/2021 | Yang | G06Q 20/389 |
| 2021/0263765 A1* | 8/2021 | Liu | G06F 9/546 |
| 2022/0224677 A1* | 7/2022 | Chen | H04L 63/0435 |
| 2022/0368596 A1* | 11/2022 | Jakobsson | G06Q 20/3678 |

\* cited by examiner

BLOCK PACKAGING METHOD BASED ON BLOCKCHAIN TRANSACTION AND ELECTRONIC DEVICE USING THE SAME

CROSS-REFERENCE TO RELATED APPLICATIONS

This application claims priority to Chinese Patent Application No. 202011541034.3 filed on Dec. 23, 2020, the contents of which are incorporated by reference herein.

FIELD

The subject matter herein generally relates to a field of blockchain, and especially relates to a block packaging method based on blockchain transaction and an electronic device.

BACKGROUND

In a decentralized blockchain network, each node of the blockchain network follows a set of consensus algorithms to define block's packaging authority. The node with the block's packaging authority transmits the packed block to all nodes by broadcasting. After receiving the broadcasted block, other nodes first verify the validity of the broadcasted block, and then write the valid block into the blockchain. The existing proof of work (POW) consensus algorithm makes all nodes in the blockchain network must spend a lot of computing resources to calculate a hash value in order to determine which node obtains block's packaging authority.

BRIEF DESCRIPTION OF THE DRAWINGS

Implementations of the present disclosure will now be described, by way of embodiment, with reference to the attached figures.

DETAILED DESCRIPTION

Figure 1:
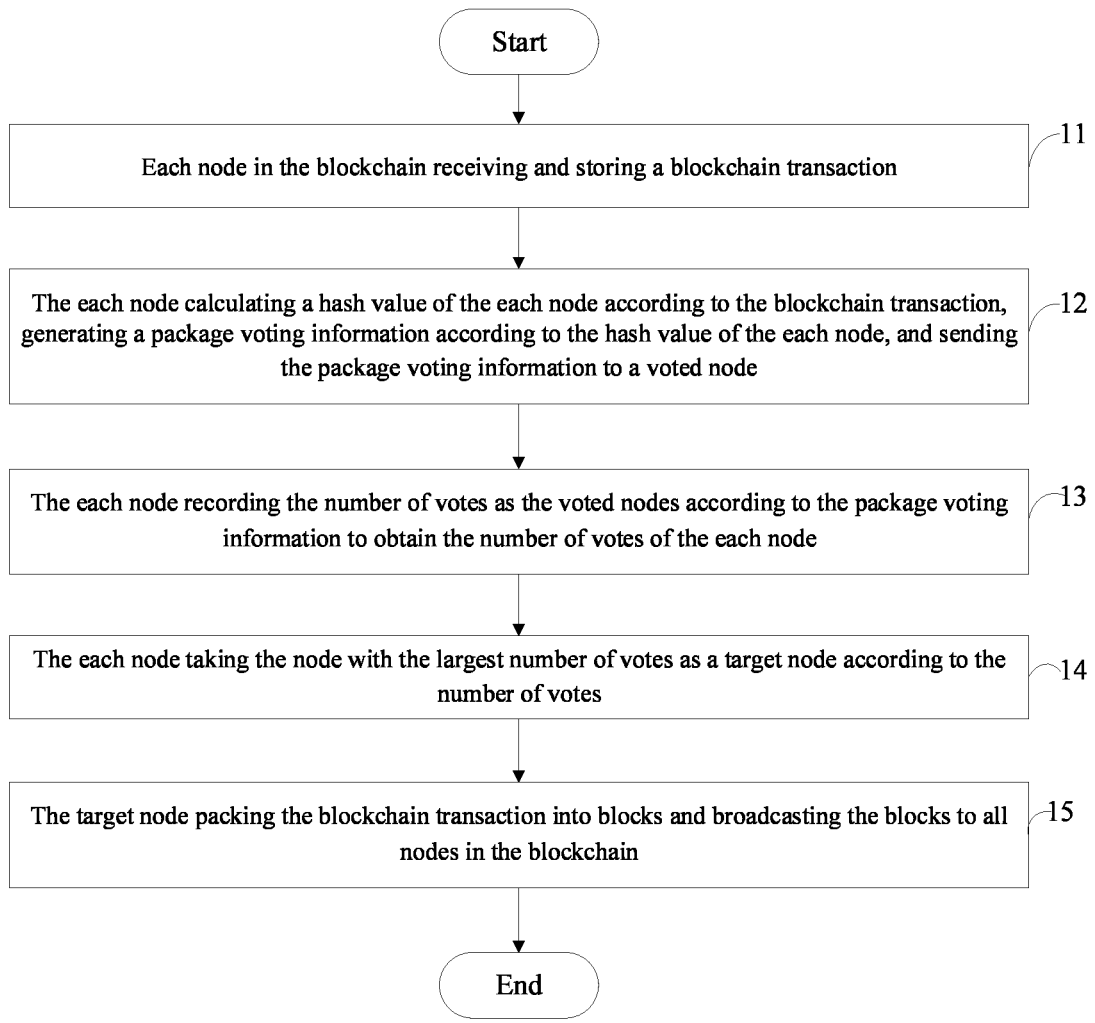
FIG. 1 is a flowchart of one embodiment of a block packaging method based on blockchain transaction.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one".

The term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series, and the like.

An image defect detection method is illustrated in the disclosure. The method is applied in one or more electronic devices. The electronic can automatically perform numerical calculation and/or information processing according to a number of preset or stored instructions. The hardware of the electronic device includes, but is not limited to a microprocessor, an Application Specific Integrated Circuit (ASIC), a Field Programmable Gate Array (FPGA), a Digital signal processor (DSP), or an embedded equipment, etc.

In one embodiment, the electronic device can be a desktop computer, a notebook computer, a tablet computer, a cloud server or other computing devices. The device can carry out a human-computer interaction with user by a keyboard, a mouse, a remote controller, a touch pad or a voice control device.

FIG. 1 illustrates the block packaging method based on blockchain transaction. The method is applied in the electronic device 6 (referring to FIG. 3). The method is provided by way of example, as there are a variety of ways to carry out the method. Each block shown in FIG. 1 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 11.

At block 11, each node in the blockchain receiving and storing a blockchain transaction.

In one embodiment, newly generated blockchain transaction is broadcast to all nodes in the blockchain by a peer-to-peer (P2P) network. The each node in the blockchain receives the blockchain transaction by the peer-to-peer network and stores the blockchain transaction in a local transaction pool of the each node. For example, after any one node in the blockchain generates a new blockchain transaction, the blockchain transaction is broadcast to all nodes in the blockchain by the peer-to-peer network. After receiving the blockchain transaction broadcast by the corresponding node, the each node in the blockchain stores the blockchain transaction in the local transaction pool of each node.

At block 12, the each node calculating a hash value of the each node according to the blockchain transaction, generating a package voting information according to the hash value of the each node, and sending the package voting information to a voted node, and the package voting information including a digital signature of the each node and an unique identification code of the voted node.

In one embodiment, the blockchain transaction is a transaction combination including a number of transactions. In one embodiment, due to transmission delay influence of the P2P network, the blockchain transaction received by the each node in the blockchain may be the same or different, that is, the transactions in the transaction combination received by each node in the blockchain may be the same or different. In one embodiment, when two nodes in the blockchain receive the same blockchain transaction, the hash values calculated by the two nodes are the same. When two nodes of the blockchain receive different blockchain transactions, the hash values calculated by the two nodes are different.

In one embodiment, the each node calculating a hash value of the each node according to the blockchain transaction and generating a package voting information according to the hash value of the each node and sending the package voting information to a voted node includes: calculating the hash value of each transaction in the transaction combination received by the each node, making the hash values of the transactions XOR with each other to obtain the hash value of the each node; respectively making the hash value of the each node XOR with an unique identification code of all nodes of the blockchain to obtain XOR distance values between the each node and all nodes of the blockchain; determining a minimum XOR distance value between the each node and all nodes of the blockchain; taking the node corresponding to the minimum XOR distance as the voted node in the package voting information of the each node; and the each node sending the package voting information to the voted node.

For example, the blockchain includes four nodes: node X, node Y, node Z and node U. The unique identification code of node X is 0xF000, the unique identification code of node Y is 0x0F00, the unique identification code of node Z is 0x00F0, and the unique identification code of node U is 0x000F, and F represents the number F in hexadecimal. The blockchain transaction includes one or more of the transaction A, the transaction B and the transaction C. The hash value of the transaction A is calculated as 0x0FFF, the hash value of the transaction B is calculated as 0xF0FF and the hash value of the transaction C is calculated as 0xFF0F. When the blockchain transaction received by the node X includes the transaction A, the transaction B and the transaction C, the node X performs XOR operation on the hash values of the transaction A, the transaction B and the transaction C, that is, 0x0FFF $\oplus$ 0xF0FF $\oplus$ 0xFF0F to obtain the hash value of the node X as 0x000F. When the blockchain transaction received by the node Y includes the transaction A, the transaction B and the transaction C, the node Y performs XOR operation on the hash values of the transaction A, the transaction B and the transaction C, that is, 0x0FFF $\oplus$ 0xF0FF $\oplus$ 0xFF0F to obtain the hash value of the node Y as 0x000F. When the blockchain transaction received by the node Z includes the transaction A and the transaction B, the node Z performs XOR operation on the hash values of the transaction A and the transaction B, that is, 0x0FFF $\oplus$ 0xF0FF to obtain the hash value of the node Y as 0xFF00. When the blockchain transaction received by the node U includes the transaction B and the transaction C, the node U performs XOR operation on the hash values of the transaction B and the transaction C, that is, 0xF0FF $\oplus$ 0xFF0F to obtain the hash value of the node U as 0x0FF0. The Node X performs XOR operation on the hash value of the node X with the unique identification codes of the node X, the node Y, the node Z and the node U respectively. The XOR distance between the node X and the node X is 61455, the XOR distance between the node X and the node Y is 3855, the XOR distance between the node X and the node Z is 255, and the XOR distance between the node X and the node U is 0. As the XOR distance between the node X and the node U is the smallest, the node X takes the node U as the voted node in the package voting information of the node X, and the node X sends the package voting information to the node U. The process by which the remaining nodes Y, Z and U in the blockchain determine the voted nodes in their respective package voting information is the same as that by which the node x determines the voted nodes in the package voting information nodes.

In one embodiment, the each node in the blockchain calculates the hash value of the each node according to the blockchain transaction within a preset time period, generating the package voting information according to the hash value of the each node, and sending the package voting information to the voted node. In one embodiment, the preset time period is 10 seconds At block 13, the each node recording the number of votes as the voted nodes according to the package voting information to obtain the number of votes of the each node.

In one embodiment, the each node recording the number of the voted nodes according to the package voting information to obtain the number of votes of the each node includes: the each node generating the package voting information according to the number of votes as the voted node, the unique identification code as the voted node and a verification information; and broadcasting the package voting information to all nodes in the blockchain.

At block 14, the each node taking the node with the largest number of votes as a target node according to the number of votes.

At block 15, the target node packing the blockchain transaction into blocks and broadcasting the blocks to all nodes in the blockchain.

In one embodiment, the target node packs the blockchain transaction into blocks and broadcasts the blocks to all nodes in the blockchain by the P2P network.

In the present disclosure, the each node takes the node with the largest number of votes as the target node, and the target node packages the received blockchain transaction into blocks and broadcasts them to all nodes in the blockchain, so as to avoid a problem that a proof consensus algorithm consumes a lot of computing resources when determining the block's packaging authority.

Figure 2:
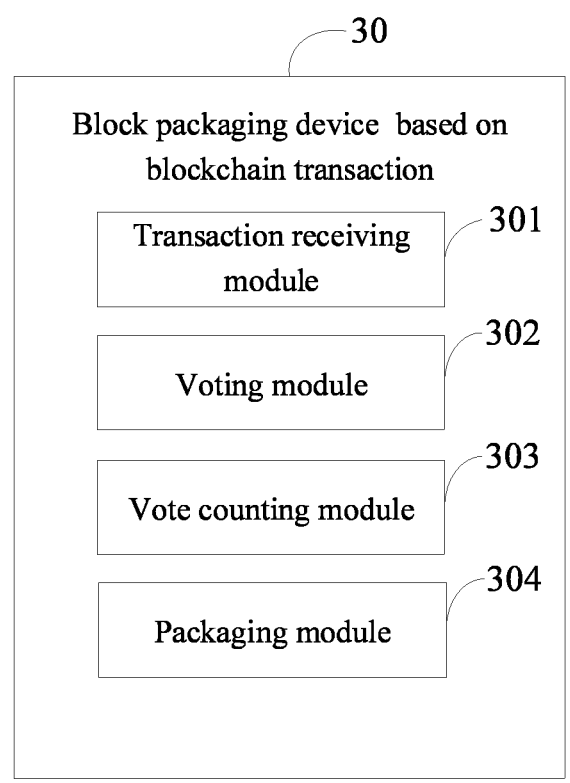
FIG. 2 is a block diagram of one embodiment of a block packaging device based on blockchain transaction.

FIG. 2 illustrates a block packaging device 30 based on blockchain transaction. The block packaging device 30 is applied in the electronic device 6. In one embodiment, according to the functions it performs, the block packaging device 30 can be divided into a plurality of functional modules. The functional modules perform the blocks 11-15 in the embodiment of FIG. 1 to perform the functions of packaging blocks.

In one embodiment, the block packaging device 30 includes, but is not limited to, a transaction receiving module 301, a voting module 302, a vote counting module 303 and a packaging module 304. The modules 301-304 of the block packaging device 30 can be collections of software instructions. In one embodiment, the program code of each program segment in the software instructions can be stored in a storage and executed by at least one processor to perform the function of packaging blocks.

The transaction receiving module controls each node in the blockchain to receive and store a blockchain transaction.

In one embodiment, newly generated blockchain transaction is broadcast to all nodes in the blockchain by a peer-to-peer (P2P) network. The each node in the blockchain receives the blockchain transaction by the peer-to-peer network and stores the blockchain transaction in a local transaction pool of each node. For example, after any one node in the blockchain generates a new blockchain transaction, the blockchain transaction is broadcast to all nodes in the blockchain by the peer-to-peer network. After receiving the blockchain transaction broadcast by the corresponding node, the each node in the blockchain stores the blockchain transaction in the local transaction pool of each node.

The voting module 302 controls the each node to calculate a hash value of the each node according to the blockchain transaction, generate a package voting information according to the hash value of the each node, and send the package voting information to a voted node, and the package voting information including a digital signature of the each node and an unique identification code of the voted node.

In one embodiment, the blockchain transaction is a transaction combination including a number of transactions. In one embodiment, due to transmission delay influence of the P2P network, the blockchain transaction received by the each node in the blockchain may be the same or different, that is, the transactions in the transaction combination received by each node in the blockchain may be the same or different. In one embodiment, when two nodes in the blockchain receive the same blockchain transaction, the hash values calculated by the two nodes are the same. When two nodes of the blockchain receive different blockchain transactions, the hash values calculated by the two nodes are different.

In one embodiment, the voting module 302 calculates the hash value of each transaction in the transaction combination received by the each node, makes the hash values of the transactions XOR with each other to obtain the hash value of the each node, respectively makes the hash value of the each node XOR with an unique identification code of all nodes of the blockchain to obtain XOR distance values between the each node and all nodes of the blockchain, determines a minimum XOR distance value between the each node and all nodes of the blockchain, takes the node corresponding to the minimum XOR distance as the voted node in the package voting information of the each node, and controls each node to send the package voting information to the voted node.

For example, the blockchain includes four nodes: node X, node Y, node Z and node U. The unique identification code of node X is 0xF000, the unique identification code of node Y is 0x0F00, the unique identification code of node Z is 0x00F0, and the unique identification code of node U is 0x000F, and F represents the number F in hexadecimal. The blockchain transaction includes one or more of the transaction A, the transaction B and the transaction C. The hash value of the transaction A is calculated as 0x0FFF, the hash value of the transaction B is calculated as 0xF0FF and the hash value of the transaction C is calculated as 0xFF0F. When the blockchain transaction received by the node X includes the transaction A, the transaction B and the transaction C, the node X performs XOR operation on the hash values of the transaction A, the transaction B and the transaction C, that is, 0x0FFF ⊕ 0xF0FF ⊕ 0xFF0F to obtain the hash value of the node X as 0x000F. When the blockchain transaction received by the node Y includes the transaction A, the transaction B and the transaction C, the node Y performs XOR operation on the hash values of the transaction A, the transaction B and the transaction C, that is, 0x0FFF ⊕ 0xF0FF ⊕ 0xFF0F to obtain the hash value of the node Y as 0x000F. When the blockchain transaction received by the node Z includes the transaction A and the transaction B, the node Z performs XOR operation on the hash values of the transaction A and the transaction B, that is, 0x0FFF ⊕ 0xF0FF to obtain the hash value of the node Y as 0xFF00. When the blockchain transaction received by the node U includes the transaction B and the transaction C, the node U performs XOR operation on the hash values of the transaction B and the transaction C, that is, 0xF0FF ⊕ 0xFF0F to obtain the hash value of the node U as 0x0FF0. The Node X performs XOR operation on the hash value of the node X with the unique identification codes of the node X, the node Y, the node Z and the node U respectively. The XOR distance between the node X and the node X is 61455, the XOR distance between the node X and the node Y is 3855, the XOR distance between the node X and the node Z is 255, and the XOR distance between the node X and the node U is 0. As the XOR distance between the node X and the node U is the smallest, the node X takes the node U as the voted node in the package voting information of the node X, and the node X sends the package voting information to the node U. The process by which the remaining nodes Y, Z and U in the blockchain determine the voted nodes in their respective package voting information is the same as that by which the node x determines the voted nodes in the package voting information nodes.

In one embodiment, the voting module 302 controls the each node in the blockchain to calculate the hash value of the each node according to the blockchain transaction within a preset time period, generate the package voting information according to the hash value of the each node, and send the package voting information to the voted node. In one embodiment, the preset time period is 10 seconds The vote counting module 303 controls the each node to record the number of votes as the voted nodes according to the package voting information to obtain the number of votes of the each node.

In one embodiment, the vote counting module 303 controls the each node to generate the package voting information according to the number of votes as the voted node, the unique identification code as the voted node and a verification information, and broadcast the package voting information to all nodes in the blockchain.

The vote counting module 303 further controls the each node to take the node with the largest number of votes as a target node according to the number of votes.

The packaging module 304 controls the target node to pack the blockchain transaction into blocks and broadcast the blocks to all nodes in the blockchain.

In one embodiment, the target node packs the blockchain transaction into blocks and broadcasts the blocks to all nodes in the blockchain by the P2P network.

In the present disclosure, the each node takes the node with the largest number of votes as the target node, and the target node packages the received blockchain transaction into blocks and broadcasts them to all nodes in the blockchain, so as to avoid a problem that a proof consensus algorithm consumes a lot of computing resources when determining the block's packaging authority.

Figure 3:
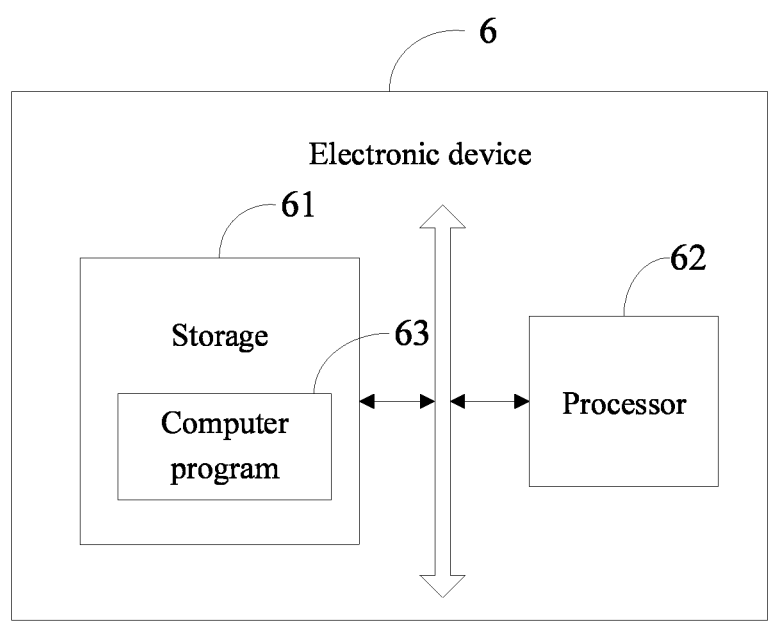
FIG. 3 is a schematic diagram of one embodiment of an electronic device.

FIG. 3 illustrates the electronic device 6. The electronic device 6 includes a storage 61, a processor 62, and a computer program 63 stored in the storage 61 and executed by the processor 62. When the processor 62 executes the computer program 63, the blocks in the embodiment of the block packaging method based on blockchain transaction are implemented, for example, blocks 11 to 15 as shown in FIG. 1. Alternatively, when the processor 62 executes the computer program 63, the functions of the modules in the embodiment of the block packaging device are implemented, for example, modules 301-304 shown in FIG. 2.

In one embodiment, the computer program 63 can be partitioned into one or more modules/units that are stored in the storage 61 and executed by the processor 62. The one or more modules/units may be a series of computer program instruction segments capable of performing a particular function, and the instruction segments describe the execution of the computer program 63 in the electronic device 6. For example, the computer program 63 can be divided into the transaction receiving module 301, the voting module 302, the vote counting module 303 and the packaging module 304 as shown in FIG. 2.

FIG. 3 shows only one example of the electronic device 6. There are no limitations of the electronic device 6, and other examples may include more or less components than those illustrated, or some components may be combined, or have a different arrangement. The components of the electronic device 6 may also include input devices, output devices, communication units, network access devices, buses, and the like.

The processor 62 can be a central processing unit (CPU), and also include other general-purpose processors, a digital signal processor (DSP), and application specific integrated circuit (ASIC), Field-Programmable Gate Array (FPGA) or other programmable logic device, discrete gate or transistor logic device, discrete hardware components, etc. The processor 62 may be a microprocessor or the processor may be any conventional processor or the like. The processor 62 is the control center of the electronic device 6, and connects the electronic device 6 by using various interfaces and lines. The storage 61 can be used to store the computer program 63, modules or units, and the processor 62 can realize various functions of the electronic device 6 by running or executing the computer program, modules or units stored in the storage 61 and calling the data stored in the storage 61.

In one embodiment, the storage 61 may mainly include a program storage area and a data storage area, wherein the program storage area may store an operating system, an application program (such as a sound playback function, an image playing function, etc.) required for at least one function, etc. The data storage area can store data (such as audio data, telephone book, etc.) created according to the use of electronic device 6. In addition, the storage 61 may include a high-speed random access memory, and may also include a non-volatile memory, such as a hard disk, an internal memory, a plug-in hard disk, a smart media card (SMC), a secure digital (SD) card, a flash card, at least one disk storage device, a flash memory device, or other volatile solid state storage device In one embodiment, the modules/units integrated in the electronic device 6 can be stored in a computer readable storage medium if such modules/units are implemented in the form of a product. Thus, the present disclosure may be implemented and realized in any part of the method of the foregoing embodiments, or may be implemented by the computer program, which may be stored in the computer readable storage medium. The steps of the various method embodiments described above may be implemented by a computer program when executed by a processor. The computer program includes computer program code, which may be in the form of source code, object code form, executable file, or some intermediate form. The computer readable medium may include any entity or device capable of carrying the computer program code, a recording medium, a USB flash drive, a removable hard disk, a magnetic disk, an optical disk, a computer memory, a read-only memory (ROM), random access memory (RAM), electrical carrier signals, telecommunication signals, and software distribution media.

The exemplary embodiments shown and described above are only examples. Even though numerous characteristics and advantages of the present disclosure have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims.

What is claimed is:

1. A block packaging method based on blockchain transaction comprising:

each node in a blockchain receiving and storing a blockchain transaction, wherein the blockchain transaction is a transaction combination comprising a plurality of transactions, and the blockchain transaction is broadcast to each of the node in the blockchain by a peer-to-peer network, due to transmission delay influence of the peer-to-peer network, the plurality of transactions comprised in the blockchain transaction received by the each of the node are different;

each of the node calculating a hash value of a corresponding node according to the blockchain transaction, generating a package voting information according to the hash value of the corresponding node, and sending the package voting information to a voted node, wherein the package voting information comprises a digital signature of the corresponding node and a unique identification code of the voted node;

the corresponding node recording the number of votes as the voted nodes according to the package voting information, and obtaining the number of votes of the corresponding node;

assigning the node with the largest number of votes as a target node according to the number of votes; and the target node packing the blockchain transaction into blocks and broadcasting the blocks to each of the node in the blockchain, wherein each of the node calculating the hash value of the corresponding node according to the blockchain transaction comprises: calculating the hash value of each of the plurality of transactions, and making the hash values of the plurality of transactions XOR with each other to obtain the hash value of the corresponding node.

2. The block packaging method as recited in claim 1, further comprising:

respectively making the hash value of the corresponding node XOR with a unique identification code of each of the node of the blockchain to obtain XOR distance values between the corresponding node and each of the node of the blockchain;

determining a minimum XOR distance value between the corresponding node and each of the node of the blockchain; taking a node corresponding to the minimum XOR distance as the voted node in the package voting information of the corresponding node; and the corresponding node sending the package voting information to the voted node.

3. The block packaging method as recited in claim 1, wherein:

each of the node in the blockchain further calculate the hash value of the corresponding node according to the blockchain transaction within a preset time period;

each of the node further generates the package voting information according to the hash value of the corresponding node; and each of the node further sends the package voting information to the voted node.

4. The block packaging method as recited in claim 1, further comprising:

each of the node generating the package voting information according to the number of votes as the voted node, assigning the unique identification code as the voted node and verification information; and broadcasting the package voting information to each of the node in the blockchain.

5. An electronic device comprising:

a processor; and a non-transitory storage medium coupled to the processor and configured to store a plurality of instructions, which cause the processor to:

control each node in a blockchain to receive and store a blockchain transaction, wherein the blockchain transaction is a transaction combination comprising a plurality of transactions, and the blockchain transaction is broadcast to each of the node in the blockchain by a peer-to-peer network, due to transmission delay influence of the peer-to-peer network, the plurality of transactions comprised in the blockchain transaction received by the each of the node are different;

control each of the node to calculate a hash value of a corresponding node according to the blockchain transaction, generate a package voting information according to the hash value of the corresponding node, and send the package voting information to a voted node, wherein the package voting information comprises a digital signature of the corresponding node and a unique identification code of the voted node;

control the corresponding node to record the number of votes as the voted nodes according to the package voting information, and obtain the number of votes of the corresponding node;

assign the node with the largest number of votes as a target node according to the number of votes; and control the target node to pack the blockchain transaction into blocks and broadcast the blocks to each of the node in the blockchain, wherein each of the node calculating the hash value of the corresponding node according to the blockchain transaction comprises:

calculating the hash value of each of the plurality of transactions, and making the hash values of the plurality of transactions XOR with each other to obtain the hash value of the corresponding node.

6. The electronic device as recited in claim 5, wherein the plurality of instructions are further configured to cause the processor to:

respectively make the hash value of the corresponding node XOR with a unique identification code of each of the node of the blockchain to obtain XOR distance values between the corresponding node and each of the node of the blockchain;

determine a minimum XOR distance value between the corresponding node and each of the node of the blockchain; and take a node corresponding to the minimum XOR distance as the voted node in the package voting information of the corresponding node; and control the corresponding node to send the package voting information to the voted node.

7. The electronic device as recited in claim 5, wherein the plurality of instructions are further configured to cause the processor to:

control each of the node to calculate the hash value of the corresponding node according to the blockchain transaction within a preset time period;

control the each of the node to generate the package voting information according to the hash value of the corresponding node; and control the each of the node to send the package voting information to the voted node.

8. The electronic device as recited in claim 5, wherein the plurality of instructions are further configured to cause the processor to:

control each of the node to generate the package voting information according to the number of votes as the voted node, assign the unique identification code as the voted node and a verification information; and control the each of the node to broadcast the package voting information to each of the node in the blockchain.

9. A non-transitory storage medium having stored thereon instructions that, when executed by at least one processor of an electronic device, causes the least one processor to execute instructions of a block packaging method based on blockchain transaction, the method comprising:

each node in a blockchain receiving and storing a blockchain transaction, wherein the blockchain transaction is a transaction combination comprising a plurality of transactions, and the blockchain transaction is broadcast to each of the node in the blockchain by a peer-to-peer network, due to transmission delay influence of the peer-to-peer network, the plurality of transactions comprised in the blockchain transaction received by the each of the node are different;

each of the node calculating a hash value of a corresponding node according to the blockchain transaction, generating a package voting information according to the hash value of the corresponding node, and sending the package voting information to a voted node, wherein the package voting information comprises a digital signature of the corresponding node and a unique identification code of the voted node;

the corresponding node recording the number of votes as the voted nodes according to the package voting information, and obtaining the number of votes of the corresponding node;

assign the node with the largest number of votes as a target node according to the number of votes; and the target node packing the blockchain transaction into blocks and broadcasting the blocks to each of the node in the blockchain, wherein each of the node calculating the hash value of the corresponding node according to the blockchain transaction comprises: calculating the hash value of each of the plurality of transactions, and making the hash values of the plurality of transactions XOR with each other to obtain the hash value of the corresponding node.

10. The non-transitory storage medium as recited in claim 9, wherein the block packaging method comprising:

respectively making the hash value of the corresponding node XOR with a unique identification code of each of the node of the blockchain to obtain XOR distance values between the corresponding node and each of the node of the blockchain;

determining a minimum XOR distance value between the corresponding node and each of the node of the blockchain; taking a node corresponding to the minimum XOR distance as the voted node in the package voting information of the corresponding node; and the corresponding node sending the package voting information to the voted node.

11. The non-transitory storage medium as recited in claim 9, wherein the block packaging method comprising:

each of the node in the blockchain further calculate the hash value of the corresponding node according to the blockchain transaction within a preset time period;

each of the node further generates the package voting information according to the hash value of the corresponding node; and each of the node further sends the package voting information to the voted node.

* * * * *